(12) United States Patent
Freal et al.

(10) Patent No.: US 7,432,620 B2
(45) Date of Patent: Oct. 7, 2008

(54) SEAL ASSEMBLY FOR A HYDROGEN-COOLED ELECTRIC POWER GENERATOR WITH INTERFACE IMPERVIOUS TO LOCATION OF PLANT PIPING

(75) Inventors: David M. Freal, Oviedo, FL (US); Samuel R. Farley, Oviedo, FL (US); Joseph Marcus Emery, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 444 days.

(21) Appl. No.: 11/136,639

(22) Filed: May 24, 2005

(65) Prior Publication Data

US 2006/0267288 A1    Nov. 30, 2006

(51) Int. Cl.
H02K 5/16 (2006.01)
(52) U.S. Cl. .................. 310/90; 277/422; 277/579
(58) Field of Classification Search ............. 310/90, 310/52, 54, 57; 277/409, 411, 422, 431, 277/579
See application file for complete search history.

(56) References Cited

U.S. PATENT DOCUMENTS

| | | |
|---|---|---|
| 3,199,877 A | 8/1965 | Cuny |
| 4,082,296 A | 4/1978 | Stein |
| 4,114,059 A | 9/1978 | Albaric et al. |
| 4,486,024 A | 12/1984 | Cooper |
| 4,579,349 A | 4/1986 | Pipich et al. |
| 4,716,327 A | 12/1987 | Stone |
| 4,969,796 A | 11/1990 | Wescott et al. |
| 5,344,160 A | 9/1994 | Scarlata et al. |
| 5,496,047 A | 3/1996 | Goldswain et al. |
| 5,509,664 A | 4/1996 | Borkiewicz |
| 5,558,341 A | 9/1996 | McNickle et al. |
| 5,755,445 A | 5/1998 | Arora |
| 6,070,881 A | 6/2000 | Longree |
| 6,082,740 A | 7/2000 | Jones et al. |
| 6,139,019 A | 10/2000 | Dinc et al. |

(Continued)

FOREIGN PATENT DOCUMENTS

GB    245821    1/1926

(Continued)

OTHER PUBLICATIONS

P.C. Stein, Shaft Seals, "Circumferential Seals for Use as Oil Seals", presented Apr. 18, 1978, 33rd Annual Meeting of ASLE, Dearborn Michigan.

*Primary Examiner*—Dang D Le

(57) ABSTRACT

A seal assembly is provided to prevent leakage of cooling fluid from a generator housing. A bracket 26 includes an inlet connectable to power plant piping for receiving a supply of sealing fluid. The inlet is in communication with a bracket passageway 32 for admitting the sealing fluid in a radially inner section of the bracket. A sealing cartridge 28 is mountable in an annulus defined by the bracket. The sealing cartridge includes at least one cartridge passageway 44 in communication with the bracket passageway for admitting the supply of sealing fluid and passing the supply of sealing fluid to establish a sealing boundary about the rotor shaft. At least one of the bracket or the sealing cartridge includes a first sealing fluid-distribution channel 30 extending along a radial direction for providing fluid communication between the bracket passageway and the at least one passageway in the sealing cartridge.

20 Claims, 3 Drawing Sheets

U.S. PATENT DOCUMENTS

| | | |
|---|---|---|
| 6,145,843 A | 11/2000 | Hwang |
| 6,189,896 B1 | 2/2001 | Dickey et al. |
| 6,338,490 B1 | 1/2002 | Bainachi |
| 6,378,873 B1 | 4/2002 | Mayer et al. |
| 6,406,027 B1 | 6/2002 | Aksit et al. |
| 6,572,113 B2 | 6/2003 | Care |
| 6,585,270 B2 | 7/2003 | Tong |
| 6,629,816 B2 | 10/2003 | Langston et al. |
| 6,692,006 B2 | 2/2004 | Holder |
| 6,707,179 B2 | 3/2004 | Guttromson et al. |

FOREIGN PATENT DOCUMENTS

| | | | |
|---|---|---|---|
| GB | 2 076 480 A | 12/1981 | |

SEAL ASSEMBLY FOR A HYDROGEN-COOLED ELECTRIC POWER GENERATOR WITH INTERFACE IMPERVIOUS TO LOCATION OF PLANT PIPING

FIELD OF THE INVENTION

The present invention is generally related to bearing bracket gland seals for preventing fluid leakage in dynamo-electric machines and, more particularly, to rotor shaft seals used in hydrogen-cooled electric power turbine generators.

BACKGROUND OF THE INVENTION

Within the power generation industry, large-scale power generators convert mechanical energy, typically the energy output of a turbine, into electrical energy. Some of the basic components of such power generators may include a frame-supported stator core that provides a relatively high permeability path for enabling a magnetic field, and a rotor assembly positioned to rotate within the stator core, so as to induce electrical current through rotor-borne conductors moving through the magnetic field set up within the stator. The resulting current may be conducted to a power plant bus for eventual power distribution to consumers, commercial establishments, and any other users of electrical power.

According to well-understood physical principles of electrical conduction through a conductor, electric current flow occurs as a result of the flow of electrons that move under the influence of an electric field through the conductor. In practical devices, heat is generated as a result of electron-level collisions, raising the temperature of the conductor and the surrounding environment. This effect can be especially pronounced within large-scale power systems where large currents are generated. Conductor cooling is a conventional technique used in relatively large turbine-generator systems for dissipating heat to cooling media within their housing. A cooling medium that is often used in such turbine-generators is hydrogen. It is known to use shaft seal assemblies to prevent the hydrogen gas from escaping from the generator housing.

In a typical shaft seal assembly, sealing oil is pumped by way of an external power plant piping 10, as may be appreciated in FIG. 5, that feeds sealing oil to a passageway internally disposed in a bracket member 12. This inlet passageway in the bracket passes oil to a corresponding internal passageway in a sealing cartridge for delivery to the rotor surface for sealing purposes. The oil leaving both the air and hydrogen sides of the seal assembly is then typically collected and returned via corresponding internal outlet passageways in the sealing cartridge and the bracket connected to power plant piping 14, such as may be connected to return the oil to a seal oil reservoir (not shown).

The foregoing presumes that one is able to readily and consistently align the internal passageways to one another. In practice, the position, e.g., radial position, of any given power plant piping, such as either oil supply pipe 10 or oil return pipe 14, relative to the inlet passageway or outlet passageway in the bracket may vary from plant to plant. For example, the point of arrival (or departure) of the power plant piping is not under the control of the manufacturer of the generator seal and could be at any quadrant on the frontal face of the bracket, e.g., left side, right side, top side, bottom side, etc. This poses interface challenges since plant-to-plant variation in the radial position of the external power plant piping may require ad hoc modification of components in the seal assembly in order to ensure an appropriate registration between the bracket passageways and the seal cartridge passageways. Accordingly, it would be desirable to address the foregoing interface challenges to provide, at a relatively low-cost, structural means and techniques that allow for reliable passage of sealing oil for the shaft seal assembly, without being affected due to variation that may occur in the location of the power plant piping.

BRIEF DESCRIPTION OF THE DRAWINGS

These and other advantages of the invention will be more apparent from the following description in view of the drawings that show.

DETAILED DESCRIPTION OF THE INVENTION

Figure 1:
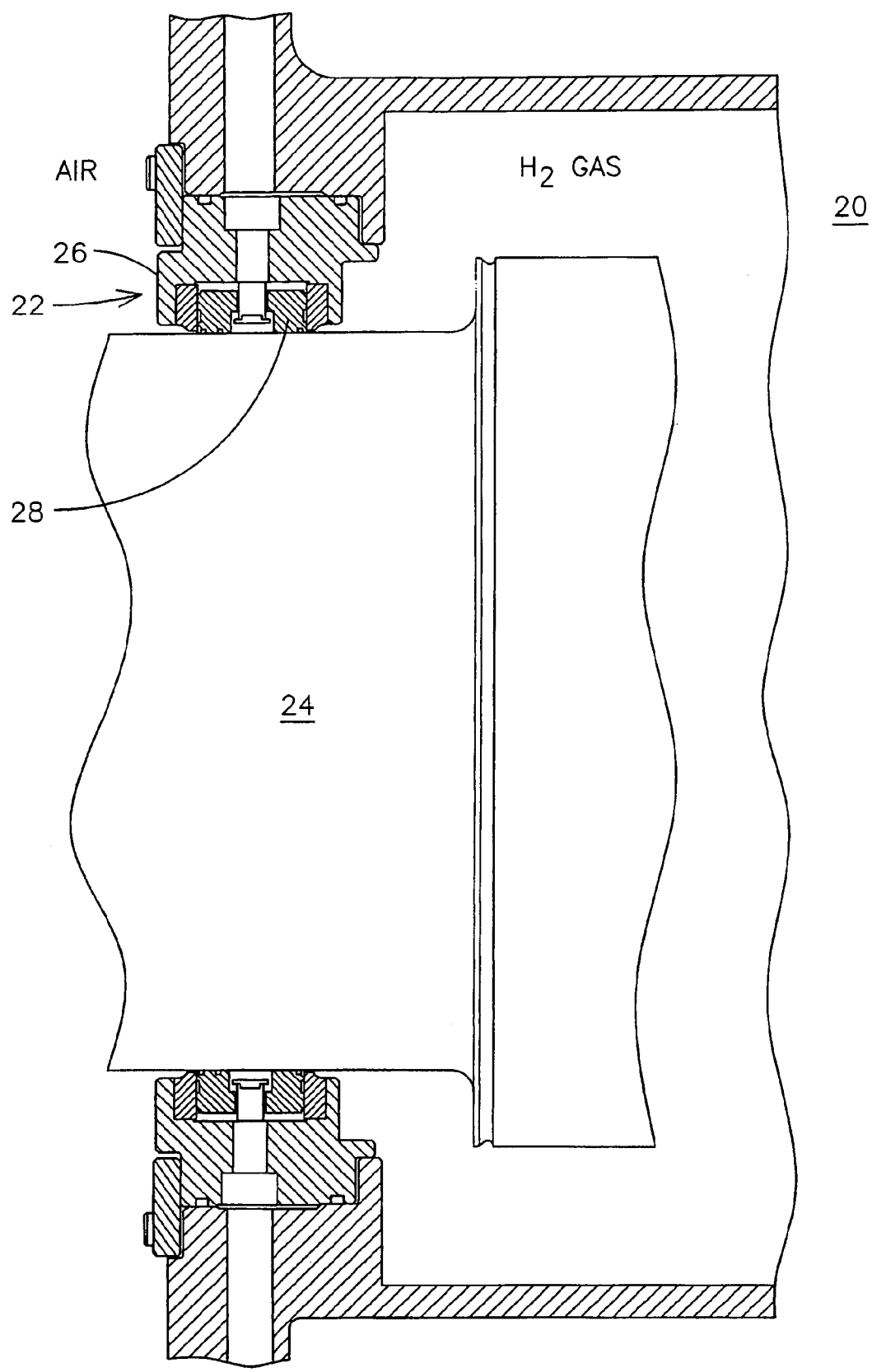
FIG. 1 is cross sectional view of part of a hydrogen-cooled dynamoelectric machine.

FIG. 1 is cross sectional view of part of a hydrogen-cooled dynamoelectric machine, such as a generator 20. This view may be used for having a better understanding of an exemplary operational environment contemplated by aspects of the present invention. The hydrogen-cooled generator employs shaft seal assemblies 22 circumferentially disposed at each end of the generator's rotor 24 so that a cooling fluid, such as hydrogen gas, is prevented from escaping from the generator housing and also so that air is not permitted to enter the generator housing. Shaft seal assemblies generally comprise a bracket member 26 and one or more sealing cartridges 28, which are fitted proximate to the shaft's circumference. A sealing fluid, such as oil, acts as a barrier fluid and is provided at the interface between the shaft and sealing cartridges in order to prevent the passage of gas through this gap. The oil is commonly provided at a pressure that exceeds both the hydrogen pressure within the generator and the atmospheric pressure of the air at the axially outboard region of the generator.

Figure 2:
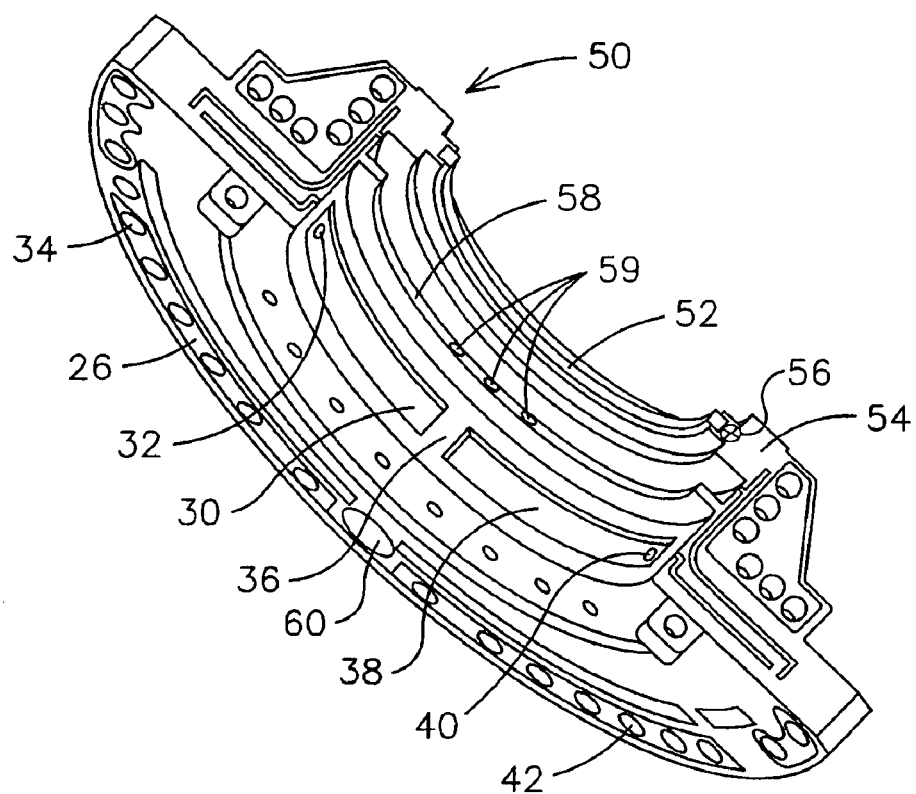
FIG. 2 illustrates an isometric view of one exemplary semi-circular segment of a bracket component for a rotor shaft seal assembly embodying aspects of the present invention.
Figure 5:
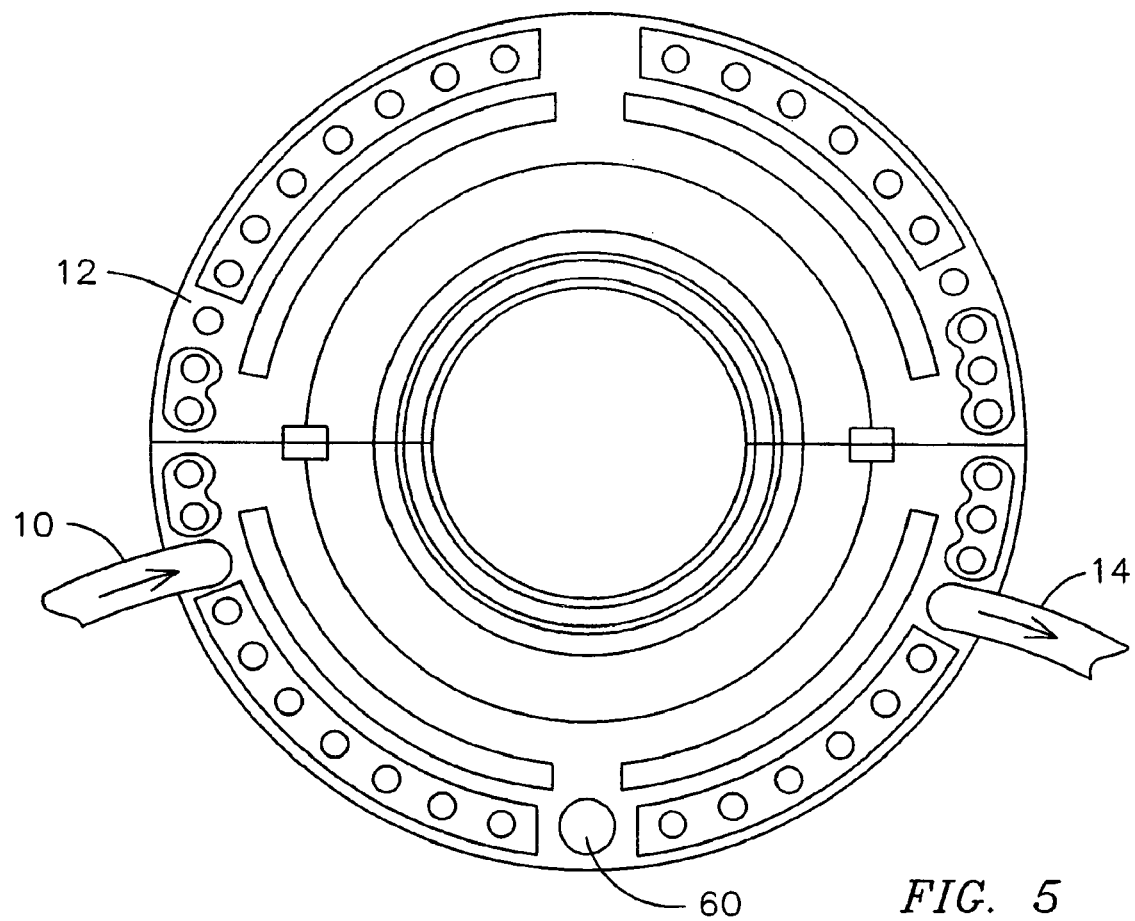
FIG. 5 is a front elevational view of a rotor shaft assembly illustrating an exemplary interface with power plant piping for receiving and returning a sealing fluid.

FIG. 2 illustrates an isometric view of one exemplary semi-circular segment of a bracket 26 embodying aspects of the present invention. As shown in FIG. 2, a first sealing-fluid distribution structure, such as a channel 30 that extends along a circumferential direction over a desired arc-length may be disposed at a radially inner section of bracket 26. In one exemplary embodiment the arc length of channel 30 may be in a range of approximately 80° per quadrant. Exemplary ranges of the depth and width of the channel may be as follows: 2.0 w×0.75 d [inch]. An opening 32 allows supplying sealing oil into channel 30. Opening 32 corresponds to an end of a passageway constructed in the generator bearing bracket and in communication with an inlet 34, where, for example, power plant piping 10 (FIG. 5) for supplying oil to the seal assembly may be connected. Thus, in one exemplary embodiment, channel 30 constitutes a structure for circumferentially collecting and distributing sealing oil admitted for passage into sealing cartridge 28.

FIG. 2 further illustrates a wall 36 that separates channel 30 from a second channel 38 that circumferentially extends over a desired arc-length and is also disposed at the inner section of bracket 26. An opening 40 allows exit of return sealing oil from channel 38. Opening 40 corresponds to an end of a passageway constructed in the generator bearing bracket and in communication with an outlet 42 where, for example, return-oil plant piping 12 (FIG. 5) for returning oil may be connected. Thus, in one exemplary embodiment, channel 38 constitutes a structure for circumferentially collecting and providing exit to oil returned from sealing cartridge 28.

Figure 3:
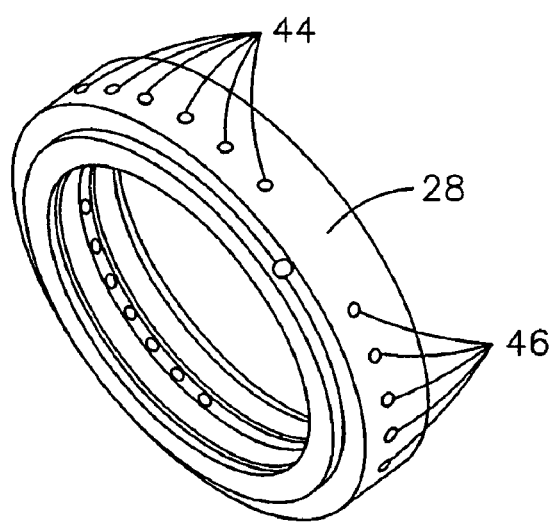
FIG. 3 is an isometric view of a sealing cartridge, part of a rotor shaft seal assembly embodying aspects of the present invention.

FIG. 3 is an isometric view of sealing cartridge 28, which is received at an annular section defined when two semicircular segments of bracket 26 are joined together. It will be appreciated that aspects of the present invention are not limited to a segmented bracket since bracket 26 could be constructed as a single piece. Furthermore, in the event of a segmented construction, the bracket 26 need not be limited to semicircular segments since the angular span of the bracket segments could be different than 180 degrees.

As illustrated in FIG. 3, sealing cartridge 28 includes a plurality of oil-admittance openings 44 for passing oil that accumulates at channel 30 through respective internal passageways in the sealing cartridge toward the rotor surface, where upon contacting the rotating surface of the rotor, the oil produces a thin oil film between the shaft and the seal ring. By way of comparison, in one known seal assembly, the lack of a circumferentially-extending channel 30 could have required time-consuming and burdensome machining in order to ensure registration between opening 32 and a respective oil-admittance opening in the sealing cartridge. It is noted that in such known seal assembly, a baseline registration provided at the factory may not be useful for a given power plant in view of a variable installation position of the bracket. This is to accommodate variation in the radial position of the power plant piping.

Sealing cartridge 28 further includes a plurality of oil-return openings 46 for passing return oil received at channel 38 (FIG. 2) through respective internal passageways in the sealing cartridge. In this case, the return oil exits channel 38 through exit opening 40 in communication with outlet 42 where, for example, return-oil plant piping 12 may be connected. For the same reasons set forth above regarding variation in the location of the power plant piping, the lack of a channel 38 could have required time-consuming and burdensome machining in order to ensure registration between exit opening 40 and a respective oil-return opening in the sealing cartridge.

In one exemplary embodiment, when sealing cartridge 28 is positioned into the annular section defined by bracket 26, the plurality of oil-admittance openings 44 will be positioned to correspond over the arc length of channel 30 and the plurality of oil-return openings 46 will be positioned to correspond over the arc length of channel 38. It is noted that the number of oil-admittance and oil-return openings in sealing cartridge 28 may be any number required to meet the volumetric flow of sealing oil required for any given application. For example, depending on the application, even a single oil-admittance opening and a single oil-return opening respectively positioned over channels 30 and 38 may suffice. It is further noted that the exemplary embodiment described so far utilizes circumferentially-extending channels constructed in the bracket 26. It is envisioned, however, that such channels could be constructed on the outer surface of the sealing cartridge in lieu of the inner section of the bracket.

Figure 4:
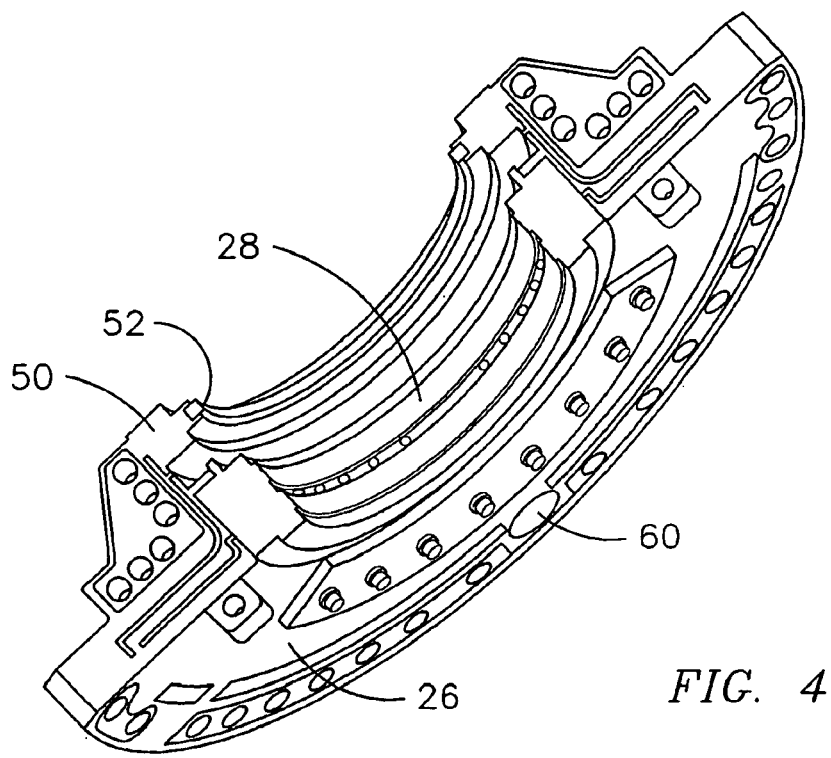
FIG. 4 is a cut-away isometric view depicting sealing cartridge as assembled into the bracket 26 of the rotor shaft seal assembly.

FIG. 4 is a cut-away isometric view depicting sealing cartridge 28 as assembled into bracket 26. As may be seen in FIGS. 2 and 4, the bracket further comprises an axially inboard section 50 that includes an oil wiper element 52 that circumferentially rides on the rotor shaft for preventing any residue of oil that may have passed from the sealing cartridge 28 and otherwise could pass into the generator housing. Wiper 52 may be mounted on a support base 54 that may include a biasing means 56, such as a wave spring, a suspension mechanism, resilient material, or any biasing device or structure that would circumferentially urge wiper 52 against the rotor surface. Wiper 52 may be made of a substantially non-abrasive material, such as Teflon material, carbon, brass, nylon, neoprene rubber, etc. A collector channel 58 for collecting residue oil is positioned axially outward relative to the wiper 52 to collect the residue oil from wiper 52. Collector channel 58 includes one or more drain holes 59 in communication with an outlet opening 60 for passing oil residue for appropriate disposal and/or recycling.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An electric power generator comprising:
  a generator housing containing a cooling fluid;
  a rotor shaft extending through said housing;
  a seal assembly positioned about said rotor shaft to prevent leakage of cooling fluid from said generator housing, said seal assembly comprising:
    a bracket affixed to said housing, wherein said bracket includes an inlet connectable to power plant piping external to said generator for receiving a supply of sealing fluid, said power plant piping being connectable along a radial position that may vary from plant-to-plant, said inlet in communication with a bracket passageway for admitting the sealing fluid in a radially inner section of the bracket; and
    a sealing cartridge mountable in an annulus defined by said bracket, wherein said sealing cartridge includes at least one cartridge passageway in communication with said bracket passageway for admitting the supply of sealing fluid and passing said supply of sealing fluid to establish a sealing boundary about the rotor shaft, wherein at least one of the bracket or the sealing cartridge includes a first sealing-fluid distribution structure extending along a circumferential direction for providing fluid flow communication between the bracket passageway and the at least one passageway in the sealing cartridge to supply the sealing fluid to establish the sealing boundary about the rotor shaft regardless of a variable installation position of said bracket to accommodate variation in the radial position of the power plant piping for receiving the supply of sealing fluid.

2. The electric power generator of claim 1 wherein said sealing cartridge further comprises at least one passageway for returning the sealing fluid to the radially inner section of the bracket, and wherein said bracket includes a passageway providing an exit to the return sealing fluid, said bracket passageway in communication with an outlet connectable to power plant piping external to said generator for receiving the return sealing fluid, wherein at least one of the bracket or the sealing cartridge includes a second sealing-fluid distribution structure extending along a circumferential direction for establishing fluid communication between the passageway in the bracket and the at least one passageway in the sealing cartridge regardless of a variable installation position of said bracket to accommodate variation in the position of the plant piping for receiving the return sealing fluid.

3. The electric power generator of claim 2 wherein said bracket comprises at least two circumferentially joined bracket segments.

4. The electric power generator of claim 2 wherein said first sealing-fluid distribution structure comprises a channel disposed at the radially inner section of the bracket and extending over an arc length.

5. The electric power generator of claim 4 wherein said second sealing-fluid distribution structure comprises a channel disposed at the radially inner section of the bracket and extending over an arc length, said radially inner section of the bracket including a wall for separating the respective channels for the first and second fluid distribution structures.

6. The electric power generator of claim 2 wherein said first sealing-fluid distribution structure comprises a channel disposed at an outer section of the sealing cartridge and extending over an arc length.

7. The electric power generator of claim 6 wherein said second sealing-fluid distribution structure comprises a channel disposed at the outer section of the sealing cartridge and extending over an arc length.

8. The electric power generator of claim 1 wherein the annulus in said bracket further comprises an axially inboard section, said axially inboard section providing a base for receiving a wiper positioned to circumferentially engage the rotor shaft and prevent any residue of sealing fluid from passing into the generator housing.

9. The electric power generator of claim 8 wherein said base includes a biasing mechanism for urging said wiper against the rotor shaft.

10. The electric power generator of claim 8 wherein said wiper comprises a polymer material.

11. A seal assembly to be positioned about a rotor shaft of an electric power generator to prevent leakage of cooling fluid from a generator housing, said seal assembly comprising:
a bracket affixed to said housing, wherein said bracket includes an inlet connectable to power plant piping external to said generator for receiving a supply of sealing fluid, said power plant piping being connectable along a radial position that may vary from plant-to-plant, said inlet in communication with a bracket passageway for admitting the sealing fluid in a radially inner section of the bracket; and
a sealing cartridge mountable in an annulus defined by said bracket, wherein said sealing cartridge includes at least one cartridge passageway in communication with said bracket passageway for admitting the supply of sealing fluid and passing said supply of sealing fluid to establish a sealing boundary about the rotor shaft, wherein at least one of the bracket or the sealing cartridge includes a first sealing fluid-distribution channel extending along a circumferential direction for providing fluid flow communication between the bracket passageway and the at least one passageway in the sealing cartridge to supply the sealing fluid to establish the sealing boundary about the rotor shaft regardless of a variable installation position of said bracket to accommodate variation in the radial position of the power plant piping for receiving the supply of sealing fluid.

12. The seal assembly of claim 11 wherein said sealing cartridge further comprises at least one passageway for returning the sealing fluid to the radially inner section of the bracket, and wherein said bracket includes a passageway providing an exit to the return sealing fluid, said bracket passageway in communication with an outlet connectable to power plant piping external to said generator for receiving the return sealing fluid, wherein at least one of the bracket or the sealing cartridge includes a second sealing-fluid distribution structure extending along a circumferential direction for establishing fluid communication between the passageway in the bracket and the at least one passageway in the sealing cartridge regardless of a variable installation position of said bracket to accommodate variation in the position of the plant piping for receiving the return sealing fluid.

13. The seal assembly of claim 12 wherein said bracket comprises at least two circumferentially joined bracket segments.

14. The seal assembly of claim 12 wherein said first sealing-fluid distribution structure comprises a channel disposed at the radially inner section of the bracket and extending over an arc length.

15. The seat assembly of claim 14 wherein said second sealing-fluid distribution structure comprises a channel disposed at the radially inner section of the bracket and extending over an arc length, said radially inner section of the bracket including a wall for separating the respective channels for the first and second fluid distribution structures.

16. The seal assembly of claim 12 wherein said first sealing-fluid distribution structure comprises a channel disposed at an outer section of the sealing cartridge and extending over an arc length.

17. The seal assembly of claim 16 wherein said second sealing-fluid distribution structure comprises a channel disposed at the outer section of the sealing cartridge and extending over an arc length.

18. The seal assembly of claim 11 wherein the annulus in said bracket further comprises an axially inboard section, said axially inboard section providing a base for receiving a wiper positioned to circumferentially engage the rotor shaft and prevent any residue of sealing fluid from passing into the generator housing.

19. The seal assembly of claim 18 wherein said base includes a biasing mechanism for urging said wiper against the rotor shaft.

20. The seal assembly of claim 18 wherein said wiper comprises a polymer material.

* * * * *